United States Patent
Lindholm et al.

(10) Patent No.: US 7,456,835 B2
(45) Date of Patent: **\*Nov. 25, 2008**

(54) REGISTER BASED QUEUING FOR TEXTURE REQUESTS

(75) Inventors: John Erik Lindholm, Saratoga, CA (US); John R. Nickolls, Los Altos, CA (US); Simon S. Moy, Los Altos, CA (US); Brett W. Coon, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 11/339,937

(22) Filed: Jan. 25, 2006

(65) Prior Publication Data

US 2006/0119607 A1      Jun. 8, 2006

Related U.S. Application Data

(63) Continuation of application No. 10/789,735, filed on Feb. 27, 2004, now Pat. No. 7,027,062.

(51) Int. Cl.
G06T 11/40 (2006.01)
G06T 15/00 (2006.01)
G06T 1/00 (2006.01)
G09G 5/00 (2006.01)

(52) U.S. Cl. ............... 345/501; 345/582; 345/522; 345/552; 345/559; 711/125; 382/305

(58) Field of Classification Search ......... 345/581–582, 345/501–503, 557–559, 552, 522, 530, 536, 345/545, 537–538, 541, 543; 711/125, 133, 711/136, 159, 160, 147–148, 123; 382/303–305
See application file for complete search history.

(56) References Cited

U.S. PATENT DOCUMENTS

| | | | |
|---|---|---|---|
| 5,034,887 A | 7/1991 | Yasui et al. | |
| 5,301,295 A | 4/1994 | Leary et al. | |
| 5,706,466 A | 1/1998 | Dockser et al. | |
| 5,793,386 A * | 8/1998 | Larson et al. | 345/553 |
| 6,483,516 B1 * | 11/2002 | Tischler | 345/552 |
| 2002/0184465 A1 | 12/2002 | Grosbach et al. | |
| 2004/0227763 A1 * | 11/2004 | Wichman et al. | 345/503 |

FOREIGN PATENT DOCUMENTS

WO      WO 96-11443 A      4/1996

OTHER PUBLICATIONS

Alexander, "Der Stack Frame" Online!, 2003, pp. 1-5, XP002328991 retrieved from the internet: URL:http://www.a-m-l.de/tips/stack/stack.php.

* cited by examiner

*Primary Examiner*—Wesner Sajous
(74) *Attorney, Agent, or Firm*—Townsend and Townsend and Crew, LLP

(57) ABSTRACT

A graphics processing unit can queue a large number of texture requests to balance out the variability of texture requests without the need for a large texture request buffer. A dedicated texture request buffer queues the relatively small texture commands and parameters. Additionally, for each queued texture command, an associated set of texture arguments, which are typically much larger than the texture command, are stored in a general purpose register. The texture unit retrieves texture commands from the texture request buffer and then fetches the associated texture arguments from the appropriate general purpose register. The texture arguments may be stored in the general purpose register designated as the destination of the final texture value computed by the texture unit. Because the destination register must be allocated for the final texture value as texture commands are queued, storing the texture arguments in this register does not consume any additional registers.

21 Claims, 4 Drawing Sheets

REGISTER BASED QUEUING FOR TEXTURE REQUESTS

CROSS-REFERENCES TO RELATED APPLICATIONS

This application is a continuation of U.S. patent application Ser. No. 10/789,735, filed Feb. 27, 2004, which is incorporated by reference herein.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

A typical graphics processing subsystem includes a graphics processing unit having one or more execution units and one or more texture units. Among other tasks, execution units are responsible for processing the geometry and lighting information. Texture units perform texture mapping of scene geometry by retrieving texel data from texture maps stored in memory. Texel data is combined with pixel data produced by the execution units to determine a color value of pixels of the rendered image.

Execution units and texture units typically have different obstacles to surmount to maximize performance. Execution units typically have a deep, largely fixed processing pipeline, which makes pipeline stalls for typical execution units very expensive in terms of performance. To reduce pipeline stalls, rendering applications are often divided into numerous independent execution threads to maximize the utilization of execution units.

In contrast, the primary performance bottleneck for texture units is memory latency arising from retrieving texel data. This bottleneck is exacerbated by the tendency of the execution units to issue batches of texture commands together, rather than distributing texture commands over time. With multiple threads running on multiple execution units, the irregular timing of texture commands can seriously degrade texture unit performance.

To even out the bursts of texture commands, a buffer, for example a First-In-First-Out buffer (FIFO), can be used to queue texture commands sent to texture units. However, texture commands often include a large amount of associated data. For example, a typical texture command and its associated data may be well over 100 bits of data. A FIFO of this width consumes a large amount of circuit area in a graphics processing unit, decreasing the amount of area available for other features.

It is therefore desirable for a graphics processing system to queue texture commands efficiently and without using large FIFOs. It is further desirable for the texture queuing mechanism to scale efficiently when used with multiple execution units.

BRIEF SUMMARY OF THE INVENTION

This invention enables a graphics processing unit to queue a large number of texture requests to balance out the variability of texture requests without the need for a large texture request buffer. In an embodiment, a dedicated texture request buffer queues the relatively small texture commands and parameters. Additionally, for each queued texture command, an associated set of texture arguments, which are typically much larger than the texture command, is stored in a general purpose register. The texture unit retrieves texture commands from the texture request buffer and then fetches the associated texture arguments from the appropriate general purpose register. In a further embodiment, the texture arguments are stored in the general purpose register designated as the destination of the final texture value computed by the texture unit. Because the destination register must be allocated for the final texture value as texture commands are queued, storing the texture arguments in this register does not consume any additional registers.

In an embodiment, a graphics processing subsystem includes an execution unit comprising a texture request buffer and a register file. The register file includes a plurality of general purpose registers. The execution unit is adapted to issue a texture command to the texture request buffer and to store a texture argument in the register file. A texture unit is adapted to read the texture command from the texture request buffer and to retrieve the texture argument from the register file. The texture unit is further adapted to retrieve a portion of a texture map in response to the texture command. The texture unit computes a final texture value from the portion of the texture map and stores the final texture value in a destination register of the register file.

In a further embodiment, the execution unit is adapted to store the texture argument in the destination register of the plurality of registers, such that the texture unit is adapted to overwrite the texture argument in storing the final texture value. In an alternate embodiment, the execution unit stores the texture argument in a source register, which is separate from the destination register.

In another embodiment, the texture command includes a texture parameter. The texture command may also specify a texture mapping type and/or a texture map. In yet another embodiment, the texture unit determines from the texture parameter the source register storing the texture argument. The texture parameter specifies that the destination register of the plurality of registers is also the source register of the plurality of registers.

In still another embodiment, the execution unit is further adapted to lock the destination register to prevent changes to the texture argument in response to issuing a texture command. The execution unit is adapted to unlock the destination register in response to the texture unit storing the final texture value in the destination register.

In an additional embodiment, a second execution unit comprises a second texture request buffer and a second register file. The second register file includes a plurality of general purpose registers. The second execution unit is adapted to issue a second texture command to the second texture request buffer and to store a second texture argument in the second register file. The texture unit is further adapted to read the second texture command from the second texture request buffer, to retrieve the second texture argument from the second register file, to retrieve a portion of a second texture map from the texture memory in response to the second texture command, to compute a second final texture value from the portion of the texture map, and to store the second final texture value in a destination register of the plurality of registers of the second register file.

BRIEF DESCRIPTION OF THE DRAWINGS

The invention will be described with reference to the drawings, in which.

DETAILED DESCRIPTION OF THE INVENTION

Figure 1:
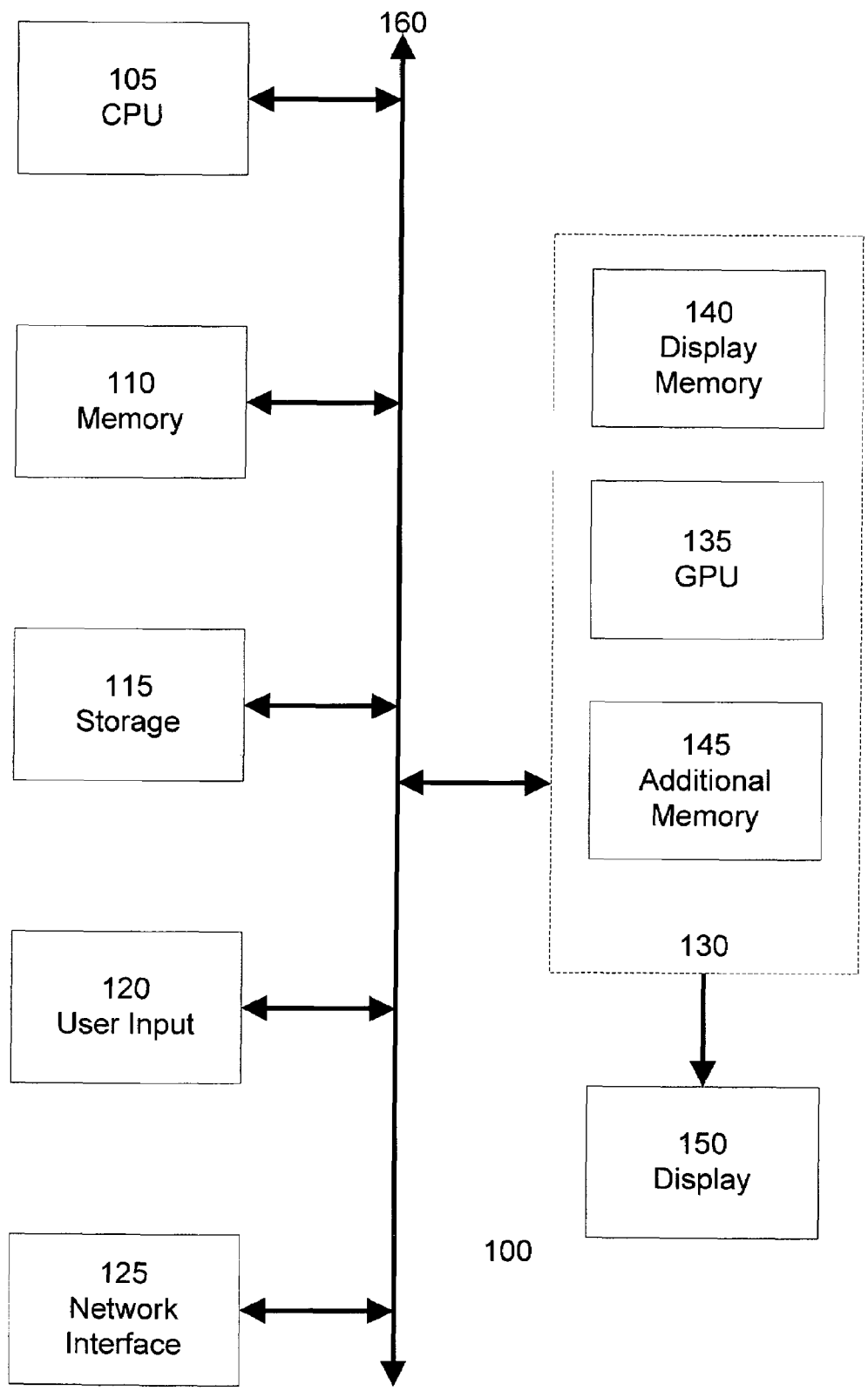
FIG. 1 illustrates a computer system suitable for implementing an embodiment of the invention.

FIG. 1 is a block diagram of a computer system 100, such as a personal computer, video game console, personal digital assistant, cell phone, or other digital device suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory or other solid-state devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X (also known as 3GIO), and HyperTransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and are shared with the CPU 105. Alternatively, display memory 140 and/or additional memory 145 are one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays, and other light-emitting and light modulating technologies. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same integrated circuit, module, chip package, or circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip, or other device used to control the data bus 160.

Figure 2:
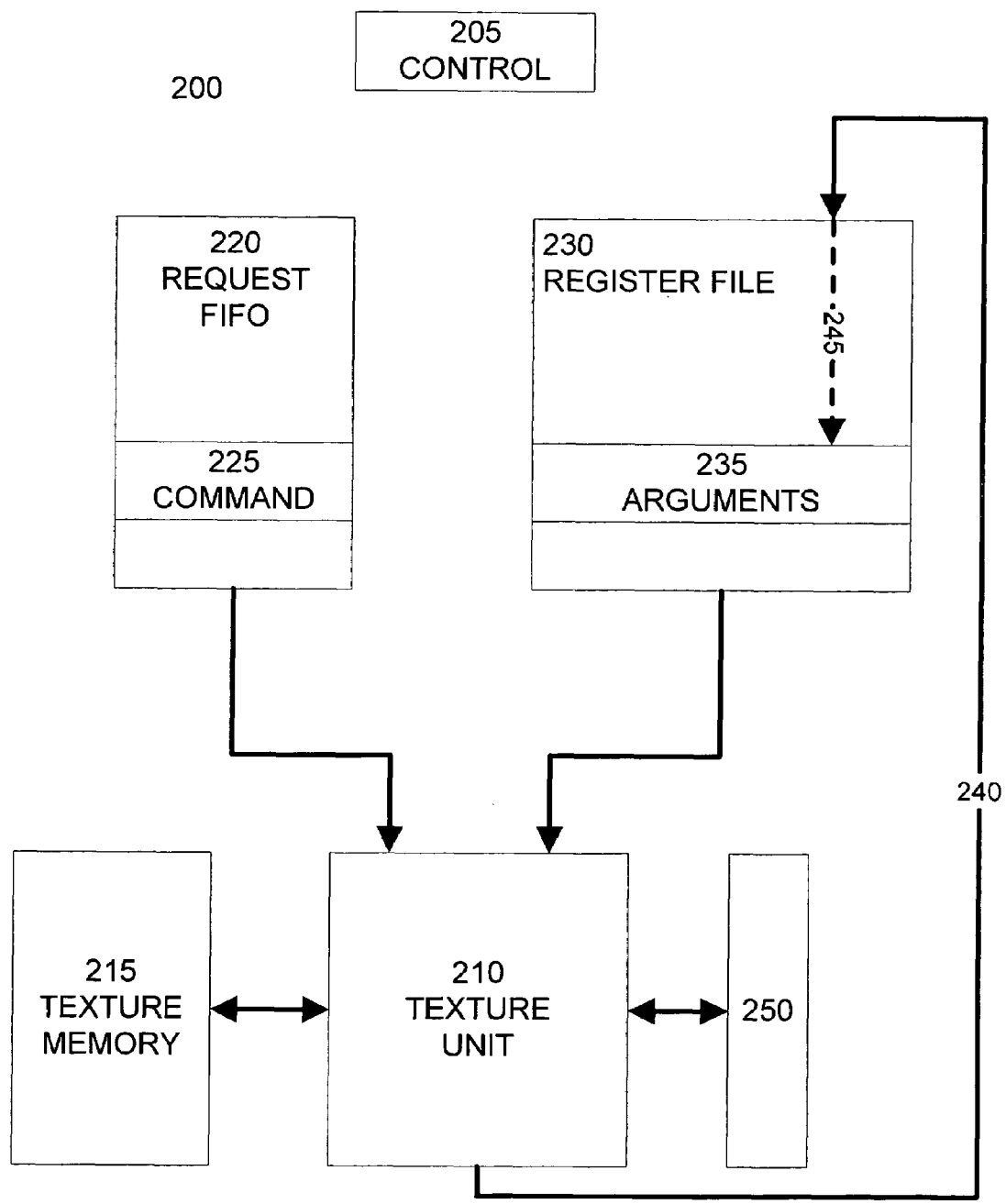
FIG. 2 illustrates a texture queuing mechanism of a graphics processing unit according to an embodiment of the invention.

FIG. 2 illustrates a texture queuing mechanism 200 of a graphics processing unit according to an embodiment of the invention. A control unit coordinates the operation of texture unit 210 with the rest of the graphics processing unit. Texture unit 210 is responsible for determining the texture value, such as a color or alpha value, for a given point on a geometric primitive. In an embodiment, the texture unit 210 receives texture commands from the control unit 205. The texture commands specify the type of texture mapping to be applied, the texture to be mapped, and other parameters needed for texturing. Additionally, texture commands typically require an associated set of texture arguments specifying the texture coordinates corresponding to the given point on a geometric primitive.

Upon receiving a texture command from the control unit 205, the texture unit 210 performs a texture mapping operation. In an embodiment, the texture mapping operation includes a level of detail determination to select one or more texture mipmap levels to be used. A sampling determination calculates a texture sampling footprint and sample weightings to be used in isotropic or anisotropic texture filtering. The texture mapping operation determines one or more texel memory addresses from the selected mipmap levels, texture sampling footprint, and texture coordinates.

The texture mapping unit retrieves the texture values at the texel memory addresses from texture memory 215. Texture memory 215 may include one or more levels of texture cache internal to the graphics processing unit as well as memory for storing textures external to the graphics processing unit. Once the required texture values have been received from the texture memory 215, texture unit 210 combines the texture values according to the sampling weights and mipmap weights to produce a final texture value. The final texture value is output from the texture unit 210 and used by other portions of the graphics processing unit to determine a color value for one or more pixels of an output image.

In texture queuing mechanism 200, the control unit 205 writes texture commands, such as command 225, to the request buffer 220. In an embodiment, request buffer 220 is a FIFO. Texture command 225 specifies texture parameters including the type of texture mapping to be applied, the texture to be mapped, and a destination for the final texture value to be output from texture unit 210. In an embodiment, the texture command is 32-bits long; thus, request buffer 220 only needs to be 32-bits wide.

In addition to the texture parameters includes in the texture command 225, texture unit 210 also requires a set of texture arguments, which include the texture coordinates to be used by the texture unit 210. Typically, the texture arguments include four texture coordinate values. If each texture coordinate value is represented as a 32-bit floating point number, the texture arguments will require 128 bits. If the set of texture arguments were to be included with the texture command in the request buffer 220, the width requirement of the request buffer 220 would increase substantially. For example, if stored together, a 32-bit texture command and a 128-bit texture argument would require 160-bit wide request buffer.

Rather than create a request buffer large enough to accommodate both texture commands and their associated texture arguments, an embodiment of the invention stores texture arguments in one of the set of general purpose registers used by an execution unit. The execution unit uses the set of general purpose registers, referred to as a register file 230, as a general purpose temporary working area for all of its computations, including non-texture related operations. By storing texture arguments in the register file 230, the size of the request buffer 220 is greatly decreased. Furthermore, as discussed below, storing texture arguments in the register file is essentially free in one embodiment of the invention.

Texture arguments 235, corresponding with texture command 225, are stored in register file 230. The texture unit 210 retrieves and processes texture commands in turn from request buffer 220. Upon retrieving texture command 225 from the request buffer 220, texture unit 210 also retrieves texture arguments 235 from a register in register file 230.

Texture unit 210 locates the corresponding set of texture arguments from the texture parameters included with texture command 225. The texture command 225 specifies a destination register in the register file 230 to store the final texture value. In an embodiment, the texture arguments 235 are located in the same register to be used to store the final texture value. In this embodiment, storing texture arguments 235 in the texture destination register consumes no extra registers, because the destination register must be reserved for the final texture value anyways. Additionally, the number of outstanding texture commands is limited only by the number of registers in the register file. Once the texture mapping operation is complete, the texture unit 210 outputs the final texture value 240 to the register file 230 and overwrites 245 the texture arguments 235.

In a further embodiment, texture arguments 235 and/or the final texture value 240 can be larger than a single register. In this embodiment, a set of multiple registers in the register file 230 are used in combination to store the texture arguments 235 and/or the final texture value 240. In a further embodiment, the set of registers in the register file 230 designated as the destination of the final texture value 240 are also used to store the texture arguments 235, thereby reducing the number of registers needed by texture command 225.

Because an embodiment overwrites texture arguments 235 with the final texture value 240, if the texture arguments 235 need to be preserved, control unit 205 can copy the texture arguments to an additional register (or registers) in the register file 230 prior to issuing a texture command. In an alternate embodiment, the texture command 225 specifies separate source and destination registers, and the texture unit 210 retrieves texture arguments 235 from the specified source register and stores the final texture value 240 in the destination register in register file 230.

In a further embodiment, a scoreboarding mechanism is used to lock registers in the register file 230 associated with the texture command 225 to prevent the execution unit from altering register contents until the texture operation is complete. A locked register cannot be written to by the execution unit; however, the texture unit 210 can still access locked registers.

In the case where the texture arguments are stored in the destination register, control unit 205 locks the destination register at the time the texture command 225 is placed into the request buffer 220. The destination register remains locked until the final texture value has been written to the destination register. As discussed above, because the destination register is locked from the time the texture command is issued, storing texture arguments in the destination register does not deprive the execution unit of an extra register.

In the case of separate source and destination registers, both registers are locked by the control unit 205 when the texture command 225 is issued. After the texture unit retrieves the texture arguments from the source register, the source register is unlocked. After the final texture value is stored in the destination register, the destination register may be unlocked as well.

In an embodiment, the texture unit 210 is pipelined and is capable of processing different texture commands in different texture pipeline stages simultaneously. To ensure that the results of each texture command are stored in the correct register, an embodiment of texture unit 210 includes a tag memory or buffer 250. Buffer 250 has a portion corresponding to each stage of the texture pipeline. Each portion of buffer 250 stores a destination register location value, which specifies the destination register for the data processed by the corresponding texture pipeline stage. As data advances from one pipeline stage to another, the corresponding destination register location value is moved to the corresponding portion of buffer 250.

Figure 3:
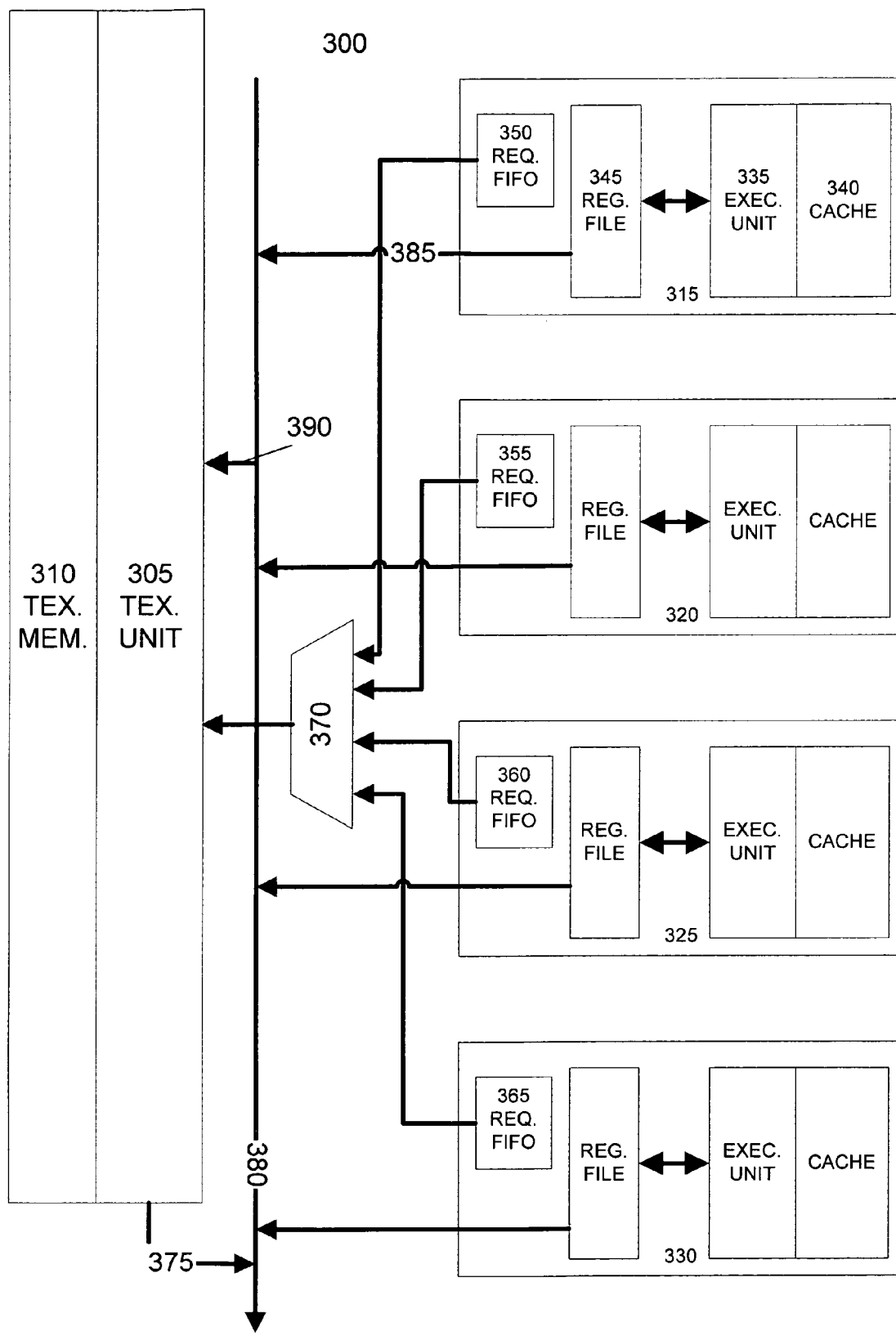
FIG. 3 illustrates a texture queuing mechanism of a graphics processing unit having multiple execution units according to an embodiment of the invention.

FIG. 3 illustrates a texture queuing mechanism of a graphics processing unit 300 having multiple execution units according to an embodiment of the invention. Graphics processing unit includes at least one texture unit 305, similar in function to texture unit 210 discussed above. Texture unit 305 is connected with texture memory 310, which may include one or more levels of internal texture cache in addition to external texture memory.

Texture unit 305 is connected with a number of independent execution units. In this embodiment, four execution units, 315, 320, 325, and 330, are connected with the texture unit 305; however, alternate embodiments of graphics processing unit 300 can have any number of execution units connected with a texture unit. Each execution unit can perform a number of different rendering-related tasks, including processing geometry data, lighting calculations, and shader programs.

A typical execution unit, such as execution unit 315, includes an execution unit core 335 for performing rendering-related tasks. The execution unit 315 can also include a cache memory 340 for storing frequently accessed instructions and data. For less frequently accessed data, a register file 345 provides the execution unit 315 with a general purpose temporary working area for all of its computations.

Request buffer 350, which in an embodiment is a FIFO, stores texture commands issued by the execution unit core 335 until they are ready to be executed by the texture unit 305. As in embodiment 200, the texture command, include texture parameters are stored in the request buffer 350. Texture arguments, for example texture coordinates, associated with the texture command are stored in a register of register file 345.

Texture unit 305 is connected with the request buffers 350, 355, 360, and 365 of execution units 315, 320, 325, and 330, respectively, via multiplexer 370. Using multiplexer 370, texture unit alternately retrieves one or more pending texture commands from the request buffers of each execution unit. In an embodiment, texture requests are retrieved from the execution units in a "round robin" schedule. In an alternate embodiment, an arbitration block unit selects pending texture requests from execution units in an order that maximizes the overall performance benefit.

In conjunction with retrieving a texture command from the request buffer of a given execution unit, texture unit 305 also retrieves a corresponding set of texture arguments from the register file of the execution unit. For example, texture unit 305 retrieves a texture command from the request buffer 350 of execution unit 315 and the corresponding texture arguments from a register of register file 345. To facilitate communication between the register file 350 of execution unit 315 and the texture unit 305, an embodiment of graphics processing unit 300 includes a data bus connection 385 between the register file 350 and a data bus 380, which in turn is connected with texture unit 305 via data bus connection 390. Execution units 320, 325, and 330 include similar data bus connections, which are omitted from FIG. 3 for clarity. In a further embodiment, texture unit output 375 is connected with data bus 380 for communicating final texture values with the register files of the execution units.

Because each texture command originates from one of many independent execution units, each of which can have many independent threads, another embodiment of graphics processing unit 300 includes thread state information as texture command parameters in each texture command. Examples of thread state information include a thread type and a thread identification. The thread state information is used by the texture unit 305 to identify the texture referenced by the texture command and to determine the destination of the final texture value.

Figure 4:
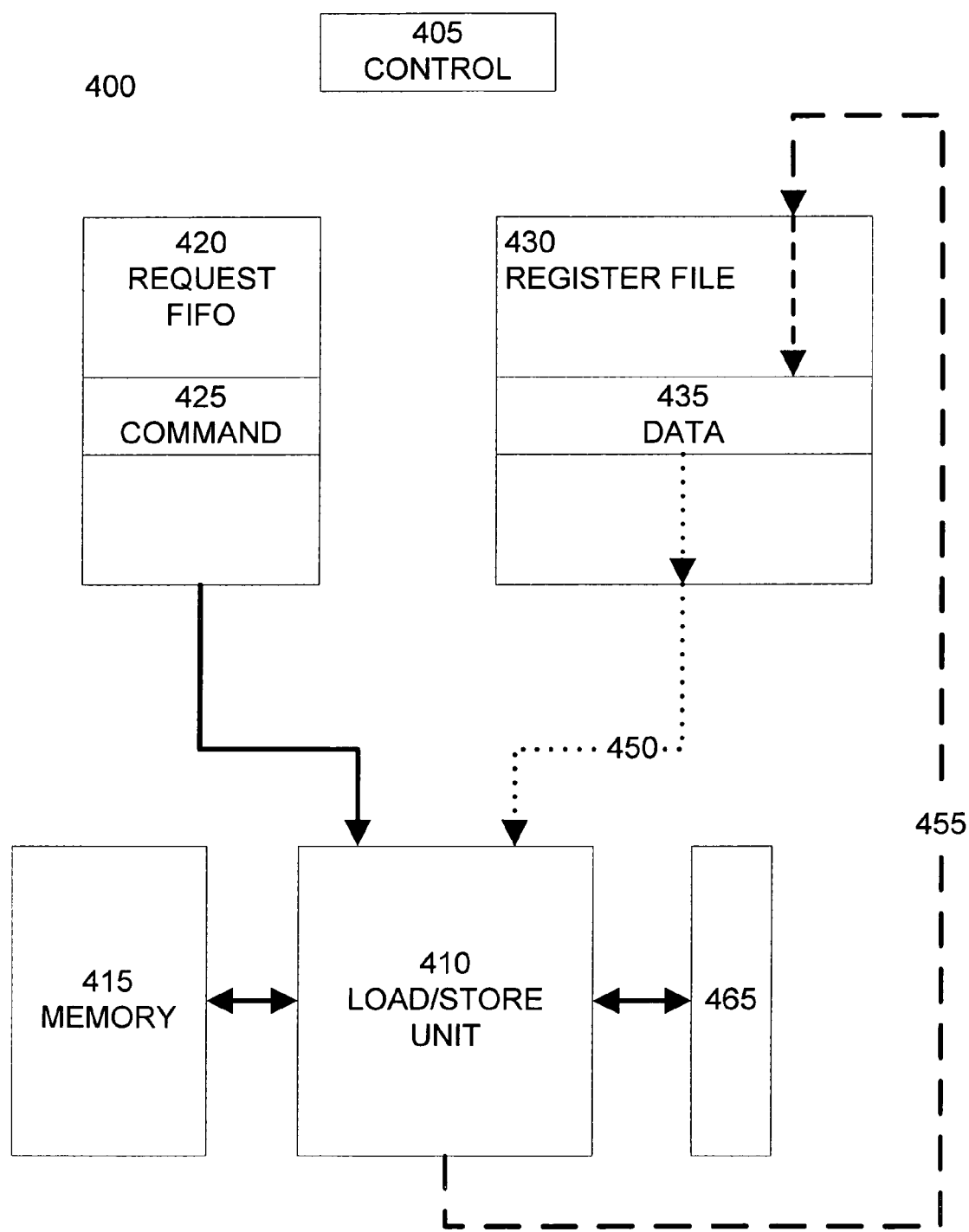
FIG. 4 illustrates a load and store command queuing mechanism of a graphics processing unit according to an embodiment of the invention.

FIG. 4 illustrates a load and store command queuing mechanism 400 of a graphics processing unit according to an embodiment of the invention. Load and store commands instruct the graphics processing unit to access external memory to load or store data. The load and store command queuing mechanism 400 operates in a similar manner to the texture queuing mechanism 200.

A control unit 400 coordinates the operation of load/store unit 410 with the rest of the graphics processing unit. Load/store unit 410 is responsible for retrieving data from external memory or storing data in external memory 415. In an embodiment, the load/store unit 410 receives load/store commands from the control unit 205. The load/store commands specify the type of operation to be performed (e.g. load or store) and other parameters needed for the operation, such as a memory address. Additionally, load/store commands typically require data to be stored in memory or a destination for data to be loaded from memory.

In load/store command queuing mechanism 400, the control unit 405 writes load/store commands, such as command 425, to the request buffer 420. In an embodiment, request buffer 420 is a FIFO. Load/store command 425 specifies parameters for the load/store operation. In an embodiment, the load/store command is 32-bits long; thus, request buffer 420 only needs to be 32-bits wide.

In addition to the parameters included in the load/store command 425, load/store unit 410 also requires a data, in the case of a store command, or a destination register, in the case of a load command. Rather than create a request buffer large enough to accommodate both load/store commands and the associated data, an embodiment of the invention stores data for a store command in a register 435 of register file 430. By storing texture arguments in the register file 430, the size of the request buffer 420 is greatly decreased. Similarly, register 435 serves as a destination register for data retrieved by a load operation.

The load/store unit 410 retrieves and processes load/store commands in turn from request buffer 420. Upon retrieving a store command 425 from the request buffer 420, load/store unit 410 also retrieves 450 data from register 435 in register file 430. A load command specifies a register, such as register 435, in the register file 430 to store the loaded data. Once the load operation is complete, the load/store unit 410 outputs the loaded data 455 to the register file 430, where it is written to register 435.

In a further embodiment, a scoreboarding mechanism is used to lock registers in the register file 430 associated with the load/store command 425 to prevent the execution unit from altering register contents until the load/store operation is complete. A locked register cannot be written to by the execution unit; however, the load/store unit 410 can still access locked registers. For a store operation, control unit 405 locks register 435 at the time the store command is placed in the request buffer 420. This register remains locked until load/store unit retrieves the data from register 435. For a load operation, the register 435, which serves as a destination register for the loaded data, is locked at the time the load command is placed in the request buffer 420. This register remains locked until load/store unit completes the load operation and the loaded data 455 is stored in the register 435.

In an embodiment, the load/store unit 410 is pipelined and is capable of processing different load/store commands in different texture pipeline stages simultaneously. To ensure that the results of each load command are stored in the correct register, an embodiment of load/store unit 410 includes a tag memory or buffer 465.

This invention enables a graphics processing unit to queue a large number of texture requests to balance out the variability of texture requests without the need for a large texture request buffer. In an embodiment, the texture arguments are stored in the general purpose register designated as the destination of the final texture value computed by the texture unit. Because the destination register must be allocated for the final texture value as texture commands are queued, storing the texture arguments in this register does not consume any additional registers. Although the invention has been discussed with respect to specific examples and embodiments thereof, these are merely illustrative, and not restrictive, of the invention. Thus, the scope of the invention is to be determined solely by the claims.

What is claimed is:

1. A method of texturing a pixel, the method comprising:
storing a texture argument in a general purpose register of a register file;
issuing a texture command to a texture request buffer, wherein the texture command is associated with the texture argument, and wherein the texture request buffer comprises a data storage location separate from the register file;
retrieving the texture command from the texture request buffer;
retrieving the texture argument from the general purpose register;
executing the texture command to produce a final texture value; and
storing the final texture value in the register file.

2. The method of claim 1, wherein the final texture value is stored in the general purpose register of the register file, thereby overwriting the texture argument.

3. The method of claim 1, wherein the final texture value is stored in a second general purpose register of the register file.

4. The method of claim 1, wherein the texture command includes a texture parameter.

5. The method of claim 4, wherein the texture parameter specifies a texture mapping type.

6. The method of claim 4, wherein the texture parameter specifies a texture map.

7. The method of claim 4, wherein retrieving the texture argument comprises identifying the general purpose register from the texture parameter.

8. The method of claim 7, wherein the texture parameter specifies the general purpose register as a destination register to store the final texture value.

9. The method of claim 7, wherein the texture parameter specifies the general purpose register storing the texture argument and a second general purpose register to store the final texture value.

10. The method of claim 1, wherein the register file and the texture request buffer are included in a first execution unit, and wherein the method further comprises:
repeating the steps of storing a texture argument, issuing a texture command, retrieving the texture command, retrieving the texture argument, executing the texture command, and storing the final texture value for a second execution unit including a second register file and a second texture request buffer.

11. The method of claim 1, wherein the texture argument includes a set of texture coordinates.

12. A graphics processing subsystem, comprising:
an execution unit comprising a texture request buffer and a register file, the register file including a plurality of general purpose registers, wherein the texture request buffer comprises a data storage location separate from the register file, and wherein the execution unit is adapted to issue a texture command to the texture request buffer and to store a texture argument in the register file;
a texture unit adapted to read the texture command from the texture request buffer and to retrieve the texture argument from the register file; and
wherein the texture unit is further adapted to retrieve a portion of a texture map in response to the texture command, to compute a final texture value from the portion of the texture map, and to store the final texture value in a destination register of the plurality of registers of the register file.

13. The graphics processing subsystem of claim 12, wherein the execution unit is adapted to store the texture argument in the destination register of the plurality of registers, such that the texture unit is adapted to overwrite the texture argument in storing the final texture value.

14. The graphics processing subsystem of claim 12, wherein the execution unit is adapted to store the texture argument in a source register of the plurality of registers, wherein the source register is separate from the destination register.

15. The graphics processing subsystem of claim 12, wherein the texture command includes a texture parameter.

16. The graphics processing subsystem of claim 15, wherein the texture parameter specifies a texture mapping type.

17. The graphics processing subsystem of claim 15, wherein the texture parameter specifies a texture map.

18. The graphics processing subsystem of claim 15, wherein the texture unit is further adapted to determine from the texture parameter a source register of the plurality of registers storing the texture argument.

19. The graphics processing subsystem of claim 18, wherein the texture parameter specifies that the destination register of the plurality of registers is also the source register of the plurality of registers.

20. The graphics processing subsystem of claim 18, wherein the texture parameter specifies the source register and the destination register of the plurality of registers, wherein the source register is separate from the destination register.

21. The graphics processing subsystem of claim 12, further comprising a texture memory connected with the texture unit and adapted to store a texture map.

* * * * *